United States Patent

[11] 3,573,815

[72] Inventor Johannes Leijten
 Woudenberg, Netherlands
[21] Appl. No. 736,823
[22] Filed June 13, 1968
[45] Patented Apr. 6, 1971
[73] Assignee Electrofact N.V.
 Amersfoort, Netherlands
[32] Priority June 19, 1967
[33] Netherlands
[31] 6708520

[54] MEASURING POINT SCANNER
 23 Claims, 6 Drawing Figs.
[52] U.S. Cl. .................................................. 340/413
[51] Int. Cl. ............................................ G08b 19/00

[50] Field of Search ........................................... 340/409, 411, 413

[56] References Cited
UNITED STATES PATENTS
2,584,680 2/1952 Doncyson ..................... 340/413

Primary Examiner—Stanley M. Urynowicz, Jr.
Attorney—Jecies and Greenside

ABSTRACT: A device for successively scanning and monitoring a plurality of measuring points which device provides an alarm when a measured point exceeds a predetermined value and a different alarm when there is a malfunction in the device itself.

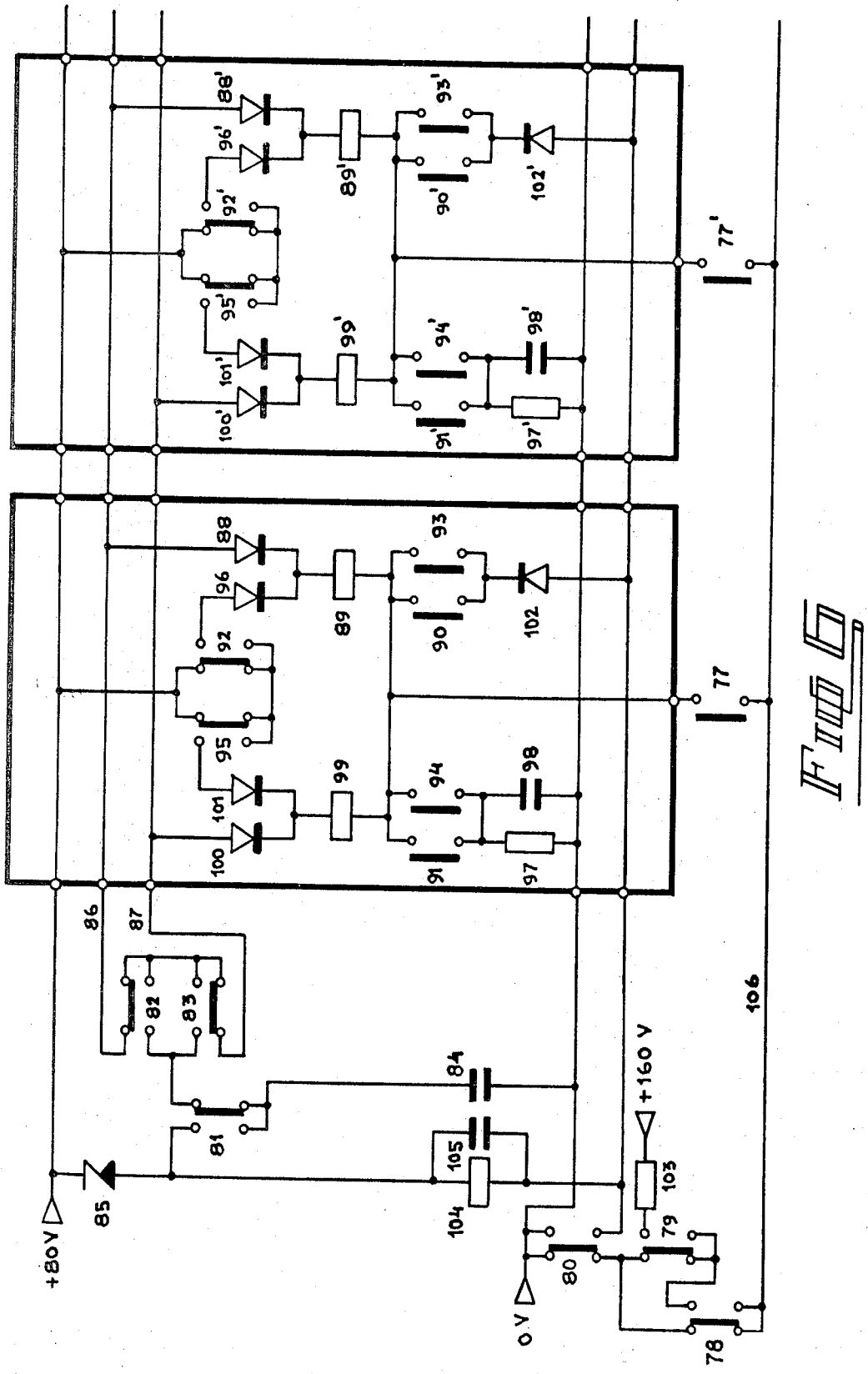

MEASURING POINT SCANNER

The invention aims at providing a device for successively scanning a plurality of measuring points, comparing the measuring values so obtained with predetermined values, providing an alarm if the comparison indicates that a measuring value exceeds a predetermined value and providing a different alarm if a condition occurs in which the device no longer operates reliably.

For that purpose, in a device for cyclically scanning and monitoring a plurality of measuring points, provided with a self-stepping measuring point selector which connects these measuring points successively to a common monitoring device, which gives a warning as soon as a measuring point connected to it supplies a measuring value which exceeds a predetermined limit value, the monitoring device is so designed that it issues a warning if the stepping is discontinued, while an internal logic circuit discontinues the stepping action on alarm occasions of the kind comprising the class of the occurrence of a fault which endangers the reliable operation and situations in which the measuring value of the measuring point connected to the monitoring device exceeds a predetermined limit value.

The invention is further elucidated below with reference to the drawing, which illustrates an embodiment of a device according to the invention.

FIG. 6 is a circuit diagram of part of a register of a device according to the invention.

Figure 1:
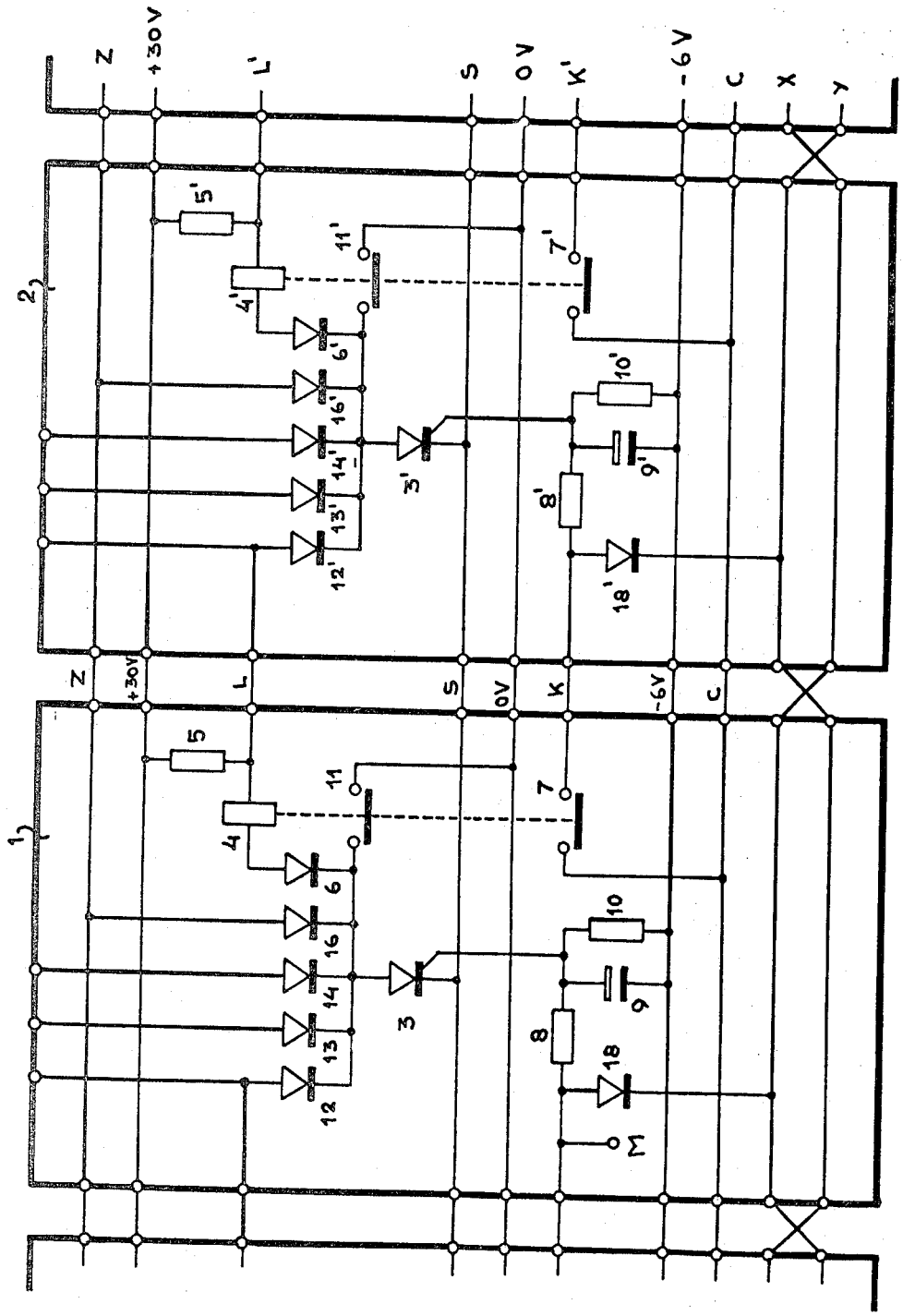
FIG. 1 is a circuit diagram of two units of a scanner according to the invention and their interconnections.

In FIG. 1, two identical units 1 and 2 from a plurality of units connected in a ring are shown, together with their interconnections and the connections to preceding and following units from the ring. The central component of each unit consists of a thyristor 3 controlling a relay 4. As all relays in this invention, the relays 4 have been shown in deenergized condition. Apart from the relay contacts shown, each relay 4 comprises further contacts by means of which it can connect the respective signal source (not shown) with the common monitoring device (not shown in FIG. 1) and can perform other functions to be elucidated below.

For making possible a distinction between corresponding components from the units 1 and 2, the reference numbers of components from unit 2 have been provided with a prime.

For the description of the operation of the measuring signal scanner, it is assumed that the thyristor 3 from the unit 1 has been ignited, so that the relay 4 is energized from the common positive supply lead +30 v., through the series resistor 5, the diode 6, the thyristor 3 and the common cathode lead S. As soon as the relay 4 is energized, it closes its contact 7, whereby the positive voltage of the common stepping lead C is applied to the successive unit 2 through the interconnection K. Thereby, the capacitor 9' with the discharging resistor 10' between the gate electrode of the thyristor 3' from the unit 2 and the common bias lead −6 v. is slowly charged through the charging resistor 8' and after a predetermined delay time, e.g. 1 second, the voltage at the gate electrode of the thyristor 3' has attained a value which ignites this thyristor, which energizes the relay 4'. At that time, the voltage at the anode of the thyristor 3' falls to a very low value and since this anode is connected with the unit 1, through the interconnection L, the energization of the relay 4 from the unit 1 is terminated. If necessary, a diode shunted across the relay coil suppresses the transient occurring upon deenergization of the relay, which otherwise might cause undesired reignition of the thyristor 3. The thyristor 3 from the unit 1 has been extinguished immediately after the energization of the relay 4, by closure of the relay contact 11 which is connected between the anode of the thyristor 3 and the common negative supply lead 0 v., which through a small resistor is connected to the common cathode lead S. As soon as the relay 4' from the unit 2 is energized, whereupon the energization of the relay 4 from the unit 1 is terminated, instead of the signal source corresponding with the unit 1, the signal source corresponding with the unit 2 is connected with the common monitoring device and moreover, through the relay contact 7' from the unit 2, the voltage of the common stepping lead C is passed to the ignition circuit of the next successive unit, so that after a given time, the thyristor from that unit ignites. In this way, the several units from the ring each operate the successive unit after a certain time delay, so that the signal scanner continuously steps itself.

For ascertaining at any time which unit is operative, some diodes 12, 13 and 14 are connected to the anode of each thyristor, which diodes can supply indicating lamps. Each diode 12 can e.g. be connected to an indicator lamp from a series of 10 indicator lamps for the units, each diode 13 can be connected to an indicator lamp from a series of 10 indicator lamps for the tens, and each diode 14 can be connected to an indicator lamp from a series of 10 indicator lamps for the hundreds. If more than 1.000 units are used in the ring, a further diode must be added and if less than 100 units are used in the ring, the diode 14 can of course be dispensed with.

In the presence of indicator lamps connected to the diodes, the resistor 5 can be dispensed with, which makes possible a considerable saving in the current consumed by the units. In that case, failure of the indicator lamp connected to a diode 12 would result in the termination of the stepping action of the scanner. If that should be undesirable, a resistor can be connected in series with the indicator lamp and a Zener diode can be shunted across the indicator lamp, which would make possible the flow of current even upon failure of the indicator lamp itself.

In a device as here described, several provisions are desirable for signalizing the occurrence of faults, and the invention aims at such provisions.

Figure 2:
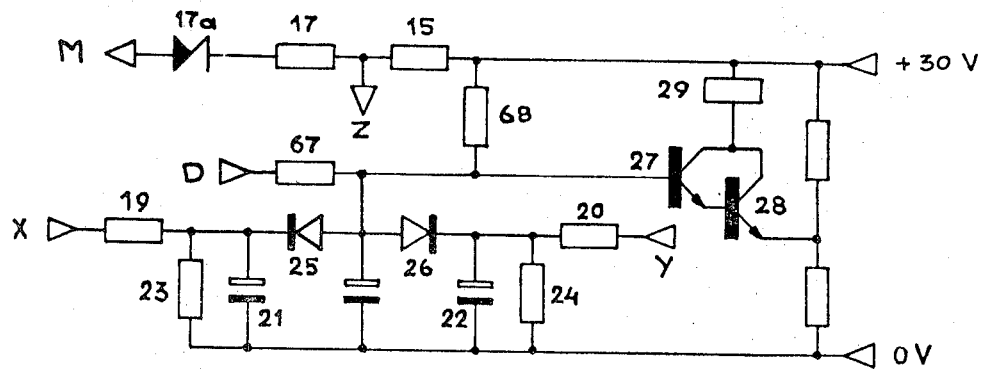
FIG. 2 is a circuit diagram of part of a monitoring device according to the invention.

In the first place, it must be ensured that one of the thyristors 3 is ignited upon putting the signal scanner into operation, since this is a necessary condition for the scanning action of the signal scanner. Also, after a momentary disruption of the supply voltage, the operation of the signal scanner must be resumed automatically. For that purpose, the positive supply lead +30 v. as shown in FIG. 2 through a resistor 15 is connected to the common supervisory lead Z, which in each unit is connected to the anode of the thyristor 3 from unit through a diode 16. As long as none of the thyristors 3 is ignited, this common supervisory lead Z carries a high voltage. Through the resistor 17 in series with the Zener diode 17a (FIG. 2), this voltage is applied to the input M of the starting circuit of one of the units from the ring so that after a certain delay, the thyristor 3 from that unit is ignited. At that time, the voltage of the common supervisory lead Z is removed and this voltage remains absent as long as one of the units from the ring is switched on, so that the stepping of the signal scanner can occur without obstruction. The diodes 16, 16' etcetera serve for decoupling of the units 1, 2 et cetera from each other, in spite of their connections to a common lead Z.

The best check on the good operation of the signal scanner consists in monitoring the regular stepping action. For that purpose, the inputs of the starting circuits of successive units from the ring, through a diode 18 are connected alternately to one of two leads X and Y respectively. As long as the signal scanner operates properly, the leads X and Y are alternately energized during equal intervals. This is monitored by the circuit shown in FIG. 2 and for that purpose, the leads X and Y respectively through charging resistors 19 and 20 respectively are connected to capacitors 21 and 22 respectively, shunted by discharging resistors 23 and 24 respectively. The discharging time constant of the capacitors 21 and 22 with the appertaining resistors exceeds the starting delay of the units from the ring, so that during proper operation of the signal scanner, both capacitors 21 and 22 remain charged at all times. As soon as the scanner fails to step properly, one of the capacitors 21 or 22 is discharged after some time (e.g. 6 seconds), so that the voltage applied to the base input of the transistors 27 and 28 connected as a Darlington pair, decreases because current flows through the resistor 68 and one of the diodes 25 or 26 and the resistor 23 or 24, so that the transistors 27 and 28 are no longer supplied with a bias current, whereby the alarm relay 29 becomes deenergized and an alarm is sounded in a way to be described below.

Figure 3:
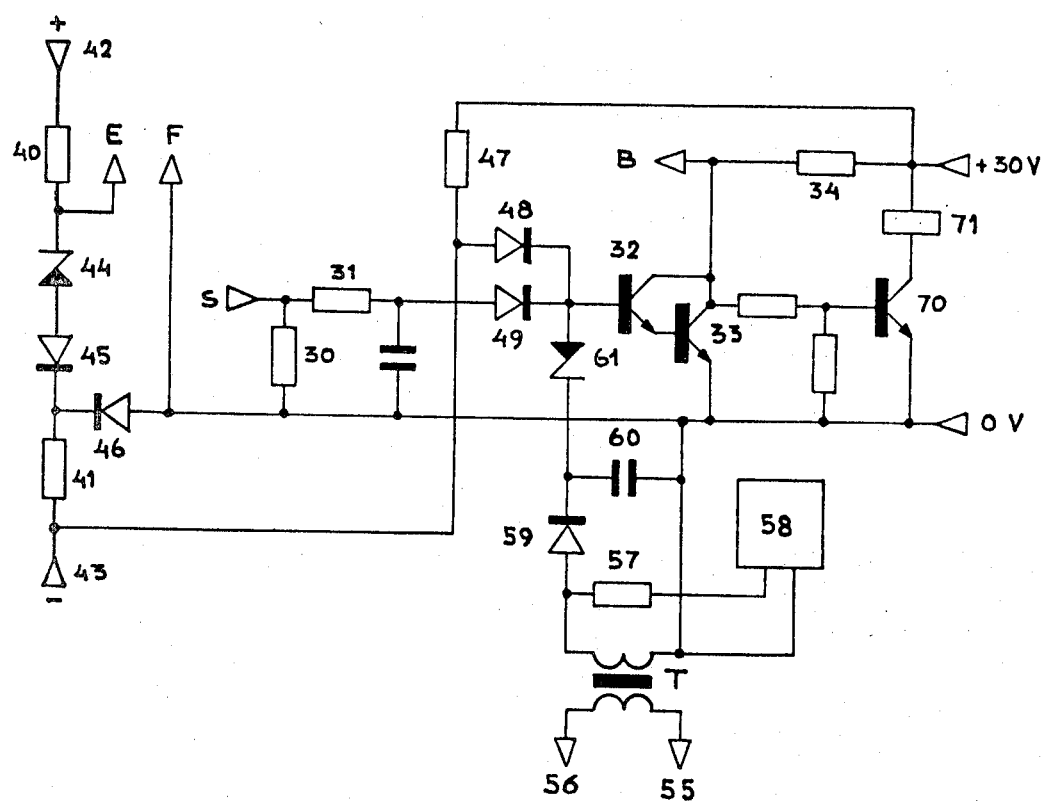
FIG. 3 is a circuit diagram of another part of a monitoring device according to the invention.

Should the relay contact 11 (FIG. 1) fail to close upon energization of the relevant relay 4, the thyristor 3 of the unit concerned would remain conducting, even after the thyristor of the successive unit is ignited, which would disrupt the operation of the signal scanner. For signalizing this too, the device of FIG. 3 is used. As long as a thyristor is ignited and the relevant contact 11 has not yet been closed, the current through this thyristor flows through the common resistor 30 connected between the common cathode lead S and the common negative supply lead 0 v., and the voltage drop occurring in this resistor, through the series resistor 31 drives the transistors 32 and 33 connected as a Darlington pair, which are saturated thereby. The collections of the transistors 32 and 33 are connected to the positive supply lead +30 v. through a resistor 34 and the collector terminal B consequently carries an appreciable voltage only as long as the transistors 32 and 33 are blocked. As soon as a current flows through the resistor 30, the voltage at the collector terminal B disappears and this voltage is used for energizing the common stepping lead C, as will be explained in further detail with reference to FIG. 4. As long as after the ignition of a thyristor from one of the units, the relevant relay contact 11 has not yet been closed, the voltage of the common stepping lead is therefor suppressed, so that stepping of the signal scanner is rendered impossible. The failure to step terminates the periodic voltage changes of the leads X and Y, which as stated before after some time results in the sounding of an alarm.

Figure 4:
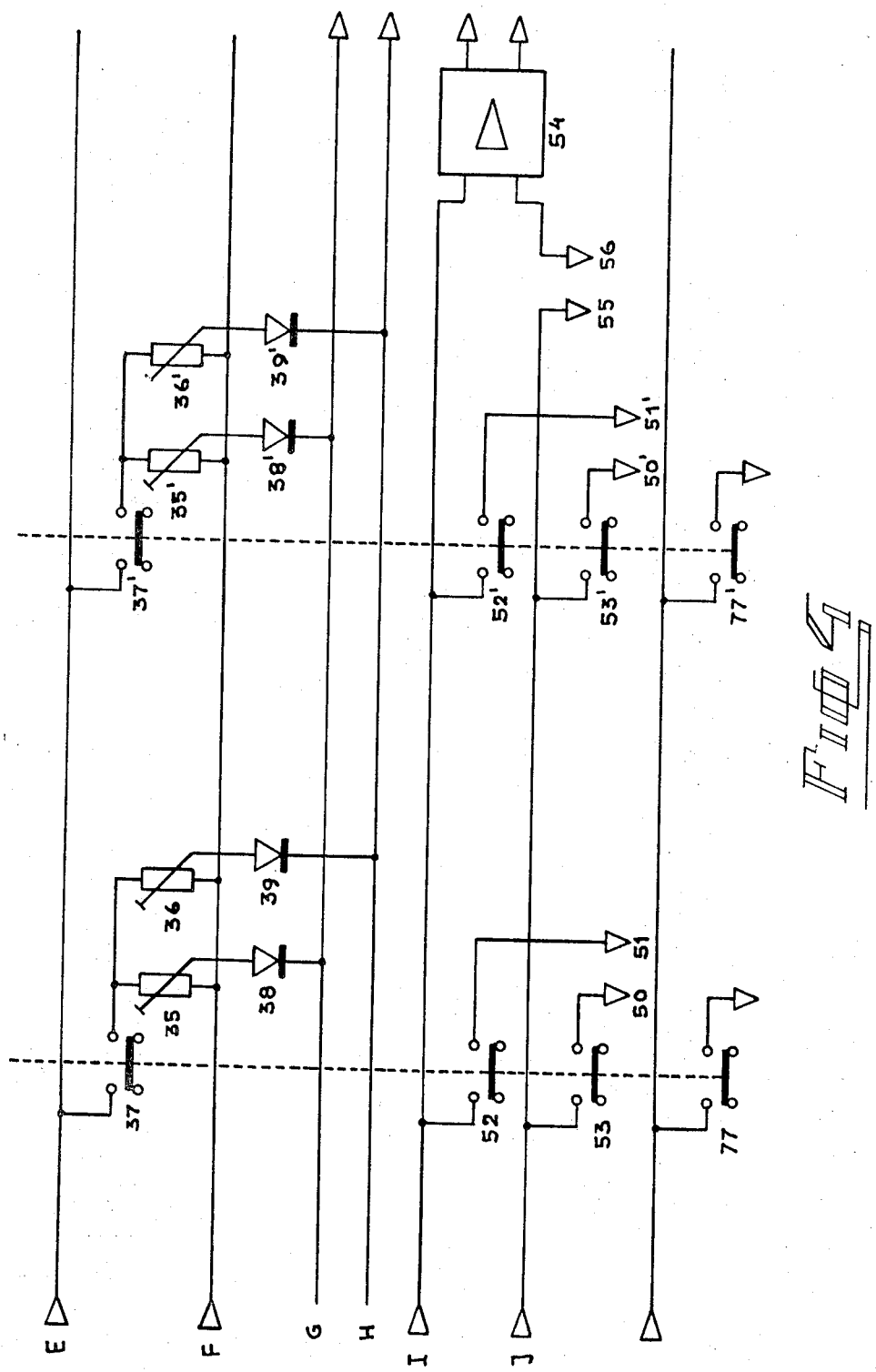
FIG. 4 is a circuit diagram of another part of a scanner according to the invention.

Since in general each measuring value can have its own nominal value and its own limit values, it is usually necessary to provide separate limit adjustment means for each measuring point. In FIG. 4, these consist of adjustable potentiometers 35, 35' et cetera for the lower limit values of the various measuring values and adjustable potentiometers 36, 36' etcetera for the higher limit values of the various measuring values. These potentiometers are supplied from common supply leads E and F through the intermediary of their own relay contacts, forming part of the contact stack of the relays of the respective units 1 and 2. The taps of the potentiometers 35, 35' et cetera are connected to a common lower limit lead G through decoupling diodes 38, 38' et cetera while the taps of the potentiometers 36, 36' et cetera are connected to a common upper limit lead H through decoupling diodes 39, 39'.

The supply leads E and F of FIG. 4 are connected to the terminals E and F in FIG. 3. These receive their supply voltage through series resistors 40 and 41 from separate supply terminals 42 and 43. The supply voltage applied to the terminals E and F is stabilized by the Zener diode 44 in series with the ordinary diode 45. A similar diode 46 is connected in series with the lead connecting to the terminal F. As long as at all times one of the relay contacts 37, 37' et cetera connects one of the sets of limit value potentiometers 35, 36 or 35', 36' et cetera to the supply leads E and F, a current passes through the diode 46, rendering this conductive. Its voltage drop is compensated for by the voltage drop across the diode 45. In that condition, the resistors 41 and 47 together form a voltage divider which provides a negative voltage with respect to the terminal 0 v. at the anode of the diode 48, the cathode of which is connected to the base terminal of the transistor 32. The diode 48 is thereby blocked and the transistor 32 is not rendered conducting by this voltage. To separate this control input from the control input through the terminal S, a further diode 49 is connected between the resistor 31 and the base electrode or the transistor 32, forming a logic gate. In the event that the actuated relay contact 37, 37' or the like should fail to close or another failure in the energization of the limit value potentiometers 35, 36, 35', 36' etcetera should occur, no current passes through the diode 46, leaving this blocked. The only connection between the voltage source connected to the terminals 42 and 43 and the anode of the diode 48 is now a direct connection between the lower side of the resistor 41 and the anode of the diode 48, so that this voltage source no longer supplies a negative voltage at the anode of the diode 48, which is rendered conducting by virtue of the resistor 47 connecting it to the supply source +30 v. The transistor 32 is now saturated by the current which the resistor 47 provides through the conducting diode 48.

Here again, saturation of the transistors 32 and 33 causes the disappearance of the voltage at the terminal B, preventing further stepping action, which as stated before causes an alarm to be sounded.

The various measuring points are connected to measuring terminals 50 and 51, 50' and 51' et cetera (FIG. 4), which through relay contacts 52 and 53, 52' and 53' et cetera are connected to common measuring leads I and J, which are connected to a common measuring amplifier 54 through a continuity test device connected to terminals 55 and 56. If all contacts operate properly and the measuring circuits are in good order, the circuits usually have a low impedance. The measuring amplifier 54, although usually having a high input impedance, is arranged to have a comparatively low input impedance for higher frequencies, say of the order of a few kilocycles. For these frequencies, a low impedance of the measuring circuit therefor reflects itself at the terminals 55 and 56, which are connected to the primary of an isolation transformer T (FIG. 3), the secondary of which therefor also establishes itself as a low impedance for these frequencies. The secondary of the transformer T is supplied from a suitable frequency source 58 through a resistor 57 and as long as the impedance of the measuring circuit for the frequencies concerned is low, hardly any alternating voltage appears across the transformer secondary. Therefor, the rectifying diode 59 charges the smoothing capacitor 60 to a negligible voltage. However, if through any failure the impedance of the measuring circuit connected at that time should become unusually high, such as by failure of one of the relay contacts 52 or 53, 52' or 53' et cetera to close or by an interruption in a measuring lead, the voltage across the transformer secondary increases to such an extent that the rectified voltage provided by the rectifying diode 59 overcomes the threshold voltage of the Zener diode 61 and drives the transistors 32 and 33, which are saturated. The Zener diode 61 also acts as an input diode isolating this gate input from the gate inputs through the diodes 48 and 49. As soon as the transistors 32 and 33 have been saturated by the voltage provided through the Zener diode 61, the voltage at the terminal B disappears, the stepping lead is deenergized and further stepping action is prevented, resulting in an alarm.

The common lower limit lead G and the output lead of the measuring amplifier 54 are each applied to a separate input of a comparator circuit (not shown) which yields an output signal as soon as the output signal of the measuring amplifier 54 exceeds the lower limit value provided by the common lower limit lead G. Similarly, the common upper limit lead H and output lead of the measuring amplifier 54 are applied to separate inputs of another comparator circuit, which provides an output signal as soon as the output signal of the measuring amplifier 54 exceeds the upper limit value provided by the common higher limit lead H.

Figure 5:
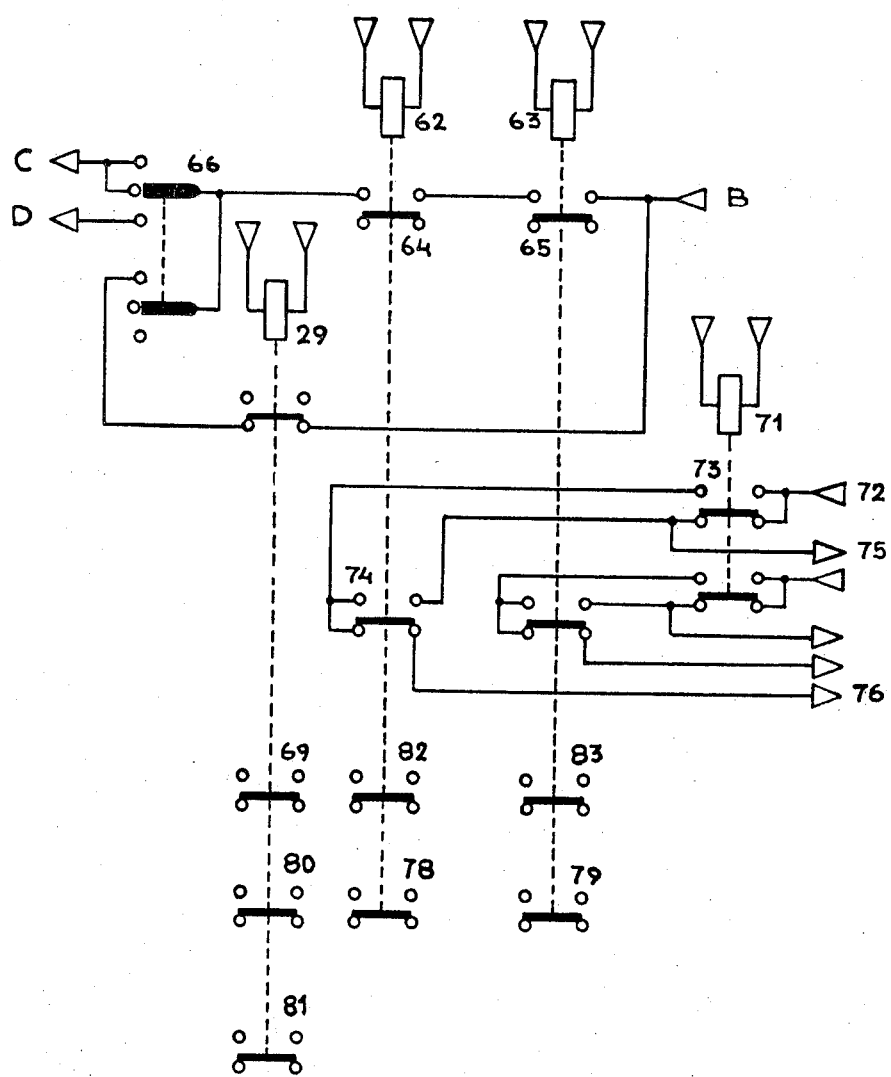
FIG. 5 is a circuit diagram of part of an alarm circuit according to the invention.

The output signal of the lower limit comparator energizes a relay with a coil 62 (FIG. 5) and the output signal of the upper limit comparator is applied to the coil 63 of a similar relay. The relay energization circuits are so designed, that the relays 62 and 63 each remain energized as long as the measuring value applied to the respective comparator does not exceed the respective limit value. In that condition, the relay contacts 64 and 65 pass the voltage at the terminal B to the contact arm 66 of a double commutator switch which in the position shown passes this voltage to the stepping lead C. This voltage is no longer applied to the stepping lead C, and further stepping action is therefor prevented, as soon as the measuring value exceeds one of the limit values, causing either relay 62 or relay 63 to become deenergized. Depending upon circumstances, exceeding the lower limit can consist of the measuring value dropping below that lower limit or rising above that lower limit. Similarly, exceeding the upper limit can consist of the measuring value dropping below that upper limit or rising above that upper limit. Of course, this would necessitate changes in the comparator circuits. These changes can be provided for by means of separate relays, energized and deenergized in dependence upon the unit of the scanner which at that time is operative.

Should it be desired that after having been stopped due to the fact that a measuring value exceeds a limit value, the scanner again starts automatically, the switch with the contact arm 66 is placed in the upper position, whereby the voltage at the terminal B is passed to the contact arm 66 as soon as the relay 29 is deenergized. As explained before, this relay becomes deenergized after a predetermined time has elapsed following a failure of the scanner to step regularly. This causes the stepping lead C to become energized again and the scanner therefor resumes stepping. If the scanner is to be stopped by manual intervention, the contact arm 66 of the commutator switch is placed in its lower position, removing the voltage from the stepping lead C. This of course causes the scanner to stop. At the same time, the voltage at the terminal B is supplied to the terminal D (FIG. 2), keeping the transistors 27 and 28 saturated through the resistor 67, whereby the relay coil 29 remains energized.

Actuation of the relay contact 69 indicates the existence of an alarm condition. If the relay 29 alone becomes deenergized, this is interpreted as an indication for an internal defect of the scanner itself. If, however, at the same time either of or both relays 64 and 65 have been deenergized, this is interpreted as a measuring value exceeding a limit value. In some cases, it is conceivable that the relay 62 and/or the relay 63 becomes deenergized by defects in the scanner itself, such as the interruption of a measuring circuit. In such cases, the transistors 32 and 33 (FIG. 3) will be rendered conducting, whereby the voltage at their collectors disappears. However, ordinarily a voltage will be present at this terminal and this will saturate the transistor 70, whereby the relay 71 is energized. In that situation, a supply voltage provided at the terminal 72 (FIG. 5) is passed through the contact set 73 of the relay 71 and the contact set 74 of the relay 62 to the output terminal 75 as long as the relay 62 remains energized, which, provided relay 29 is energized at that time, indicates that no alarm condition exists. If the relay 62 is deenergized and the relay 71 is at the same time energized, the voltage at the terminal 72 is passed to the terminal 75, which, provided that the relay 29 is deenergized at that time, indicates that the measuring value has exceeded the lower limit value. If, on the other hand, the relay 71 is deenergized at the same time as the relay 62, the voltage at the terminal 72 is still passed to the terminal 75, indicating that if at that time relay 29 is deenergized, the cause is not to be found in a measuring value exceeding the lower limit value, but rather in an internal defect. Similarly, an internal defect is signalized if relays 62 and 71 are energized simultaneously and the relay 29 is deenergized at that time, for in that case too, the voltage at the terminal 72 is passed to the terminal 75.

The same applies to the circuit involving the two lower contacts of the relay 62 for the upper limit value and the lower contacts of the relay 71 and the terminals associated therewith.

In the above, it has been assumed that the scanner is made up of identical units connected in a ring. With suitable modifications, it will also be possible to use a conventional stepping switch. It is essential, however, that any contact used in the scanner is provided with an internal safeguarding circuit and that large parts of the wiring are also safeguarded, including the wiring leading to the measuring points.

In many cases, it is desirable to store indications of the fact that a measuring value exceeded a limit value in a separate register, especially so as it is possible to have the scanner resume its stepping action after such a situation has been observed. In that case an indication of this fact would soon be lost if no register would be employed for storing this indication.

A suitable circuit for that purpose is shown in FIG. 6 and consists of a number of identical units, each of which can store an indication of the fact that a corresponding measuring value exceeded one of its limit values. Which of the several units is set up for activation, is determined by the identity of the contact 77, 77' et cetera (FIG. 4) which is closed at that time. As long as no measuring value has exceeded either of its corresponding limit values, all relays in the register remain deenergized. Assume that the scanner has closed relay contact 77 and that thereupon, it is observed that the measuring value exceeds its lower limit. The contact 78 of relay 62 assumes the condition shown, since the relay 62, being normally energized, is now deenergized. The corresponding relay contact 79 of the relay 63, however, is assumed to be in the opposite condition as the condition shown, since that relay too is normally energized. Also, the relay contact 82 of the relay 62 assumes the condition shown, while the relay contact 83 of the relay 63 is in a position opposite the condition shown. The deenergization of relay 62 causes the scanner to stop and after some time has elapsed, the relay 29 becomes deenergized, causing its contacts 80 and 81 to assume the position shown. Upon the contact 81 changing over, the capacitor 84, which has previously been charged through the Zener diode 85, now discharges through the contacts 83 and 82 into the common lower limit setting lead 86, through diode 88, relay 89 and contact 77, further through contacts 78 and 80 to the terminal 0 v. Upon the relay 89 becoming energized, it closes its contacts 90 and 91 and changes over its contact 92. Through the action of the contacts 91 and 92, the relay 89 remains energized even after the pulse provided by the capacitor 84 has terminated. The relay 89 is now energized from the terminal +80 v. through the contact 95 (in the position shown), the contact 92 (in the position opposite to the position shown), the diode 96, the relay coil 89, the contact 91 and the resistor 97 shunted by a capacitor 98 to the terminal 0 v. Further contacts of relay 89 now show that the measuring value has exceeded its lower limit in the position referred to of the scanner.

Assume that the next time contact 77 closes, it is observed that the measuring value no longer exceeds either the lower limit or the upper limit. Since in that case both relays 62 and 63 are energized and their contacts 78 and 79 are in the position opposite the position shown, the voltage at the terminal +160 v. is now passed through the resistor 103 and these contacts to the common lead 106 and through the closed contact 77 it reaches the lower terminal of the relay 89. Since the contact 91 is still closed at that time, the resistors 97 and 103 now constitute a voltage divider between the terminal +160 v. and 0 v. and after sufficient time has elapsed for charging the capacitor 98, the lower terminal of the relay coil 89 assumes a potential of +80 v. Since the upper terminal of the relay coil 89 already is at a potential of +80 v., the relay is now deenergized and the relay contacts 90 and 91 are opened, while the relay contact 92 changes over to the position shown. The indication has now been removed from the register.

If upon the next closure of the contact 77, the relay 63 is deenergized, the relay 99 will become energized in a similar way as described above for the relay 89.

If during the existence of this condition, the contact 77 again closes and the relay 72 becomes deenergized, indicating that although it has been stored in the register that the measuring value has exceeded the upper limit value, but that it is now observed that the measuring value exceeds the lower limit value, the charge accumulated in the capacitor 84 will again temporarily energize relay 89. Contact 92 will thereby change over to the position opposite the position shown and disrupt the energization of relay coil 99, so that its contact 95 changes over to the position shown and makes possible continued energization of relay coil 89. The result therefor is, that the indication given by relay 99 has been cleared and a new indication, provided by relay 89, remains stored in the register.

In certain circumstances, it can be arranged that the relays 62 and 63 become deenergized if the measuring value exceeds their respective limits in the same direction. This can be used e.g. for providing a preliminary warning, followed by a final warning if the measuring value deviates still more from the nominal value. In such conditions, it is desirable to provide for an overriding control exercised by the relay signalling the severest deviation from nominal. This can be arranged for by suitable rewiring of the contacts 82 and 83.

However, it is conceivable that the limit values are erroneously adjusted in such a way, that the criterion for the lower value exceeds the criterion for the higher value. This would result in both relays 62 and 63 becoming deenergized. Other contingencies, to be considered as an internal fault, could also give rise to that situation. In that case, neither of the relays 89 and 99 would become energized and this should result in an alarm. Also, a failure of either of the relays 89 or 99 to operate properly although energized in a correct fashion, should give rise to an alarm. It is therefor arranged, that in case either or both relays 62 and 63 become deenergized and nevertheless neither of the relays 89 and 99 operate the contacts, a register alarm unit is actuated. This unit comprises the relay 104 shunted by a capacitor 105. Normally, this relay is energized from the lead +80 v. through the Zener diode 85 and the relay contact 80 to the lead 0 v. The Zener diode 85 provides for a voltage drop of 40 v., so that the energization voltage for the relay 104 is also 40 v. If the relay contact 80 changes over and the relays 89 and 99 operate properly, either contact 90 or contact 93 is closed and the lower side of the relay 104 is connected to the terminal 0 v. through the diode 102 and one of the contacts 90 or 93, as well as the contact 77, the common lead 106 and contact 78 and possibly contact 79, as well as contact 80. If neither of the contacts 90 and 93 has closed, the contact 77 has not closed, the contact 78 and possibly the contact 79 does not operate properly, or the contact 80 does not operate properly, energization of the relay 104 is prevented. A contact of the relay 104 provides a register alarm indication in that case.

When using a register, it is of course advantageous to put the commutator switch with the switch arm 66 in the upper position, providing for automatic resumption of the stepping action after it has been determined that a measuring value exceeds a limit value. This is acceptable, because an indication thereof remains stored in the register. However, if such an indication fails to be stored in the register due to any fault in the circuitry, it is essential that automatic resumption of the stepping action of the scanner is prevented. For that purpose, a contact of the relay 104 in the deenergized condition thereof prevents further energization of the common stepping lead C.

A close study of the circuitry disclosed will reveal that, unless an internal fault in the system occurs, relay 29 will remain deenergized for short periods, if at all. Any lasting deenergization of the relay 29 points to the existence of an internal fault in the system. Such internal faults can therefor be signalized by means of a contact of the relay 29, which operates a time delay circuit which provides an alarm as soon as the relay 29 has remained deenergized continuously for a long period. Further circuits for signalizing internal faults are superfluous in that case.

I claim:

1. Device for cyclically scanning and monitoring a plurality of measuring points, comprising a scanner provided with a self-stepping measuring point selector having a plurality of selector contacts, and a common monitoring device to which these measuring points are successively connected, said monitoring device having means for giving a warning as soon as a measuring point connected to it supplies a measuring value which exceeds a predetermined limit value and for issuing a warning if the stepping is discontinued, an internal logic circuit being provided for discontinuing the stepping action of said selector on alarm occasions in the event there is a malfunction on the device which endangers its reliable operation, said stepping action also being discontinued when the measuring value of the measuring point connected to the monitoring device exceeds a predetermined limit value.

2. Device in accordance with claim 1, wherein the selector is operatively connected to a pair of leads which are energized alternately in successive selector positions, said leads being connected to a device which gives a warning if successive alternate energizations of the leads by said selector do not occur at a rate exceeding a predetermined limit rate.

3. Device in accordance with claim 2, wherein each of the pair of leads is connected to a capacitor shunted by a resistor, the output connection of each capacitor through a diode being connected to the input terminal of a level discriminator, which input terminal through a resistor is connected to a voltage source which tends to maintain the level discriminator in a condition in which no alarm is given as long as each of the diodes is blocked by the voltage of the appertaining capacitor.

4. Device in accordance with claim 1, wherein the selector is provided with a stepping lead which enables the stepping action of the selector as long as it is energized, the energization being provided by the monitoring device as long as no alarm occasion occurs.

5. Device in accordance with claim 4, wherein the selector is so designed that upon closing one of its plurality of selector contacts, it also closes a carry contact which through a time delay device connects the common stepping lead to the input terminal of a stepping device which upon energization brings the selector into the next successive position.

6. Device in accordance with claim 4, wherein the stepping lead energization is so governed by the monitoring device, that it is discontinued if the measuring value of the measuring point under observation at any given time, exceeds a predetermined value.

7. Device in accordance with claim 4, wherein the stepping lead is energized through a circuit including a logic gate which is adapted to receive at each of its input terminals a signal representing a fault.

8. Device in accordance with claim 7, wherein the stepping device is self-holding and the selector is so designed that upon closing one of its plurality of selector contacts, it actuates a further contact which terminates the self-holding action and removes a signal from an input of the logic gate.

9. Device in accordance with claim 8, wherein the selector is so designed that upon closing one of its plurality of selector contacts, it actuates a further contact selecting at least one limit value of the monitoring device, the current through said contact removing a signal otherwise existing at an input of the gate.

10. Device in accordance with claim 9, wherein each measuring circuit closed through one of the plurality of selector contacts, cooperates with a continuity measuring device, which supplies a signal to a gate input if the measuring circuit impedance exceeds a predetermined limit value.

11. Device in accordance with claim 1, wherein the selector cooperates with a register which stores the information that a predetermined limit value has been exceeded by the measuring value of a given measuring point, until upon a subsequent scanning of that measuring point by the selector, it turns out that said measuring value no longer exceeds said predetermined limit value.

12. Device in accordance with claim 11, wherein the scanner is so designed that upon closing one of its plurality of selector contacts, it actuates a register address contact which if at that time the measuring value of the measuring point connected through said selector contacts exceeds a predetermined limit value, provides for insertion of an indication thereof at said register address and, if a fault in the insertion circuit occurs, actuates a register alarm unit.

13. Device in accordance with claim 11, wherein the register is so designed, that a failure to store inserted information results in the actuation of the register alarm unit.

14. Device in accordance with claim 13, wherein the register alarm unit upon its actuation deenergizes the stepping lead.

15. Device in accordance with claim 1, wherein the monitoring device comprises separate alarm units, each of which becomes operative when the measuring value of the measuring point connected at that time exceeds a respective limit value.

16. Device in accordance with claim 15, wherein the monitoring device comprises a separate alarm circuit, which with a delay exceeding twice the stepping period, becomes operative after the stepping action of the scanner has ceased.

17. Device in accordance with claim 7, wherein the monitoring device comprises a further circuit which upon the actuation of the logic gate prevents the subsequent actuation of the limit value alarm circuit.

18. Device in accordance with claim 1, wherein the scanner comprises a plurality of identical units connected in a ring, each unit comprising a relay with a set of contacts including contacts for connecting the respective measuring point, said relay being energized through a thyristor, the gate circuit of which is energized through a relay contact of the preceding unit, each relay further comprising a contact which upon actuation of the relay short circuits the thyristor of the same unit, the energization of each relay causing the deenergization of the relay in the preceding unit.

19. Device in accordance with claim 18, wherein a plurality of storage addresses are provided in a register and are set up successively upon the scanner attaining a respective position, each such storage address upon having been set up and becoming energized by the monitoring device signalizing that the measuring value has exceeded a respective limit value and that the scanner has thereby been stopped for more than a predetermined period.

20. Device in accordance with claim 19, wherein each storage address is adapted for separate storage of limit alarms concerning different limit values.

21. Device in accordance with claim 20, wherein the different alarms of each storage address are mutually exclusive.

22. Device in accordance with claim 19, in which each storage address is adapted for being reset upon its being set up at a time at which no limit alarm prevails.

23. Device in accordance with claim 19, wherein each storage address is adapted for removing existing alarms in that storage address upon the entering of a new alarm in that storage address.